United States Patent
Shimizu

(10) Patent No.: US 6,379,439 B1
(45) Date of Patent: Apr. 30, 2002

(54) VACUUM CLEANER

(76) Inventor: Sachio Shimizu, 28-3, Saano 2-chome, Ohta-ku, Tokyo (JP), 143-0023

(*) Notice: Subject to any disclaimer, the term of this patent is extended or adjusted under 35 U.S.C. 154(b) by 0 days.

(21) Appl. No.: 09/569,053

(22) Filed: May 10, 2000

(30) Foreign Application Priority Data

May 10, 1999 (JP) ............................................. 11-164226

(51) Int. Cl.⁷ ............................................. B01D 47/02
(52) U.S. Cl. ....................... 96/333; 15/353; 55/DIG. 3; 96/337; 96/359
(58) Field of Search ........................ 55/DIG. 3; 15/353; 96/333, 334, 336, 359, 337, 340, 342, 347, 351

(56) References Cited

U.S. PATENT DOCUMENTS

| | | | | |
|---|---|---|---|---|
| 1,363,859 A | * | 12/1920 | Fetters et al. ................. | 96/351 |
| 2,102,353 A | * | 12/1937 | Brock .......................... | 96/334 |
| 2,114,780 A | * | 4/1938 | Juelson ........................ | 96/359 |
| 2,184,731 A | * | 12/1939 | Brewer ......................... | 96/337 |
| 2,221,572 A | * | 11/1940 | Brock et al. .................. | 96/333 |
| 2,314,986 A | * | 3/1943 | Johnson ....................... | 96/332 |
| 2,945,553 A | * | 7/1960 | Brock .......................... | 96/33 |
| 4,640,697 A | * | 2/1987 | Erickson, Jr. ................ | 96/333 |
| 4,693,734 A | * | 9/1987 | Erickson, Jr. ................ | 96/333 |
| 5,030,257 A | * | 7/1991 | Kasper et al. ................ | 96/333 |
| 5,090,974 A | * | 2/1992 | Kasper et al. ................ | 96/333 |
| 5,096,475 A | * | 3/1992 | Kasper et al. ................ | 96/333 |
| 5,199,963 A | * | 4/1993 | Scarp .......................... | 96/340 |
| 5,752,997 A | * | 5/1998 | Roth ........................... | 96/342 |
| 5,902,386 A | * | 5/1999 | Gustafson et al. ........... | 55/DIG. 3 |
| 6,224,656 B1 | * | 5/2001 | Kawamoto ................... | 55/DIG. 3 |

* cited by examiner

*Primary Examiner*—Duane S. Smith
(74) *Attorney, Agent, or Firm*—Wenderoth, Lind & Poanck, L.L.P.

(57) ABSTRACT

In order to elevate dust collecting efficiency by improving a suction work efficiency of a water filter type vacuum cleaner, an air containing dust particles sucked through a sucking opening by virtue of a motor driven blower provided built in a casing of the vacuum cleaner is caused to strike against water previously placed in a water tank to capture inappropriately large dust particles by the water. Moreover, other dust particles pass through a wire netting and then, are sucked together with the water to the blower by channeling the dust particles and water through a suction duct communicated with the blower. The dust particles contained in the sucked air are completely captured by the water by stirring the air and water at a high speed rotation of the blower, and the air and water are then conveyed into the water of the water tank. In the water tank, bubbles are generated by a bubble generating filter to naturally separate the water and the air, whereby clean exhaust air is provided.

20 Claims, 2 Drawing Sheets

[Fig.1]
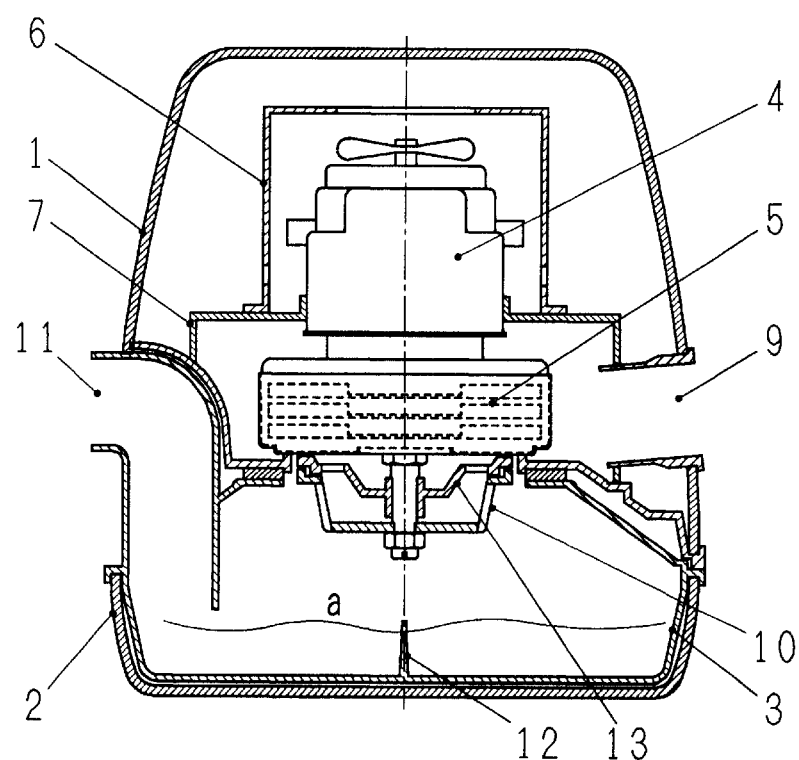
[Fig.2]
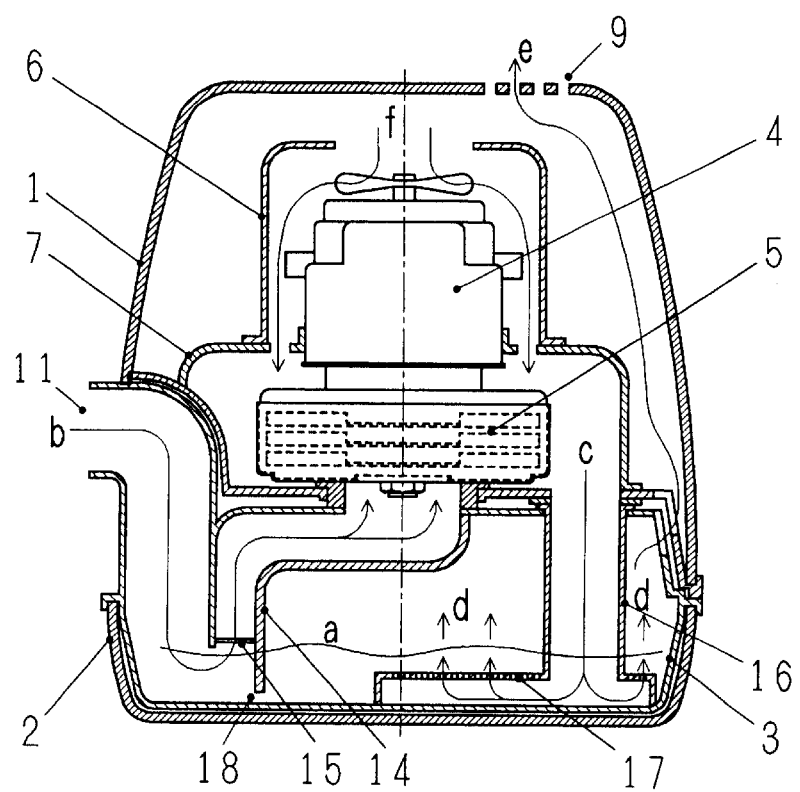

[Fig.3]
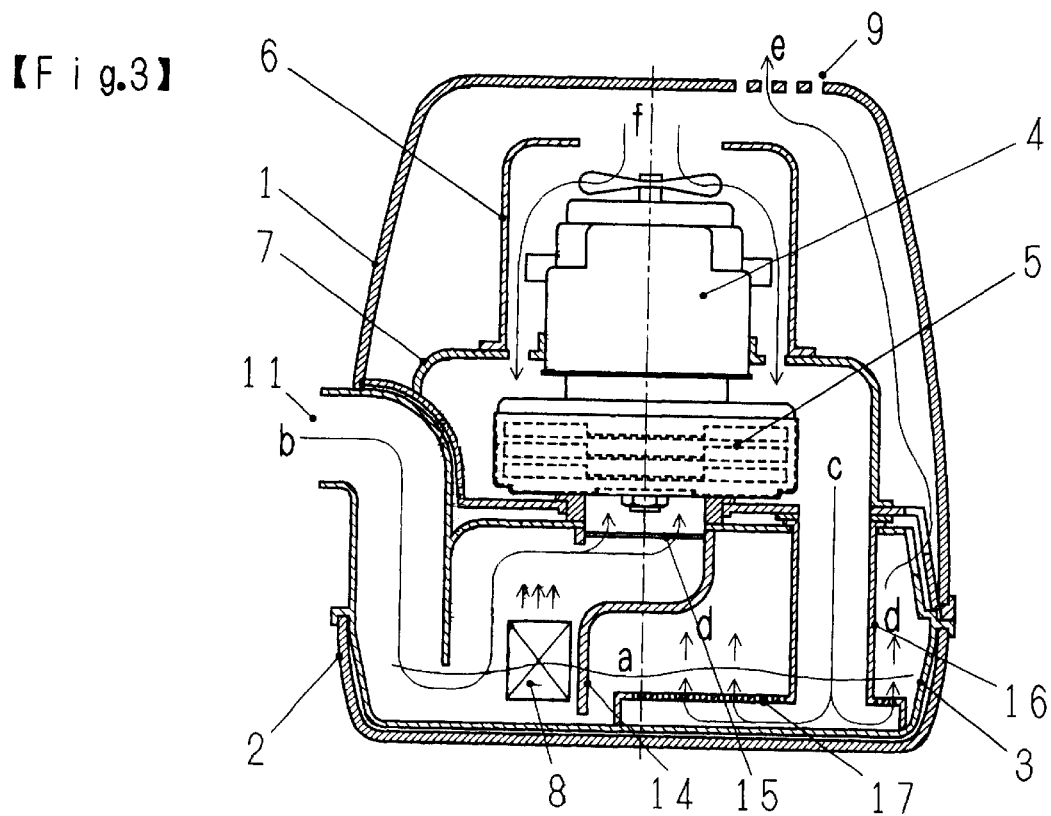
[Fig.4]
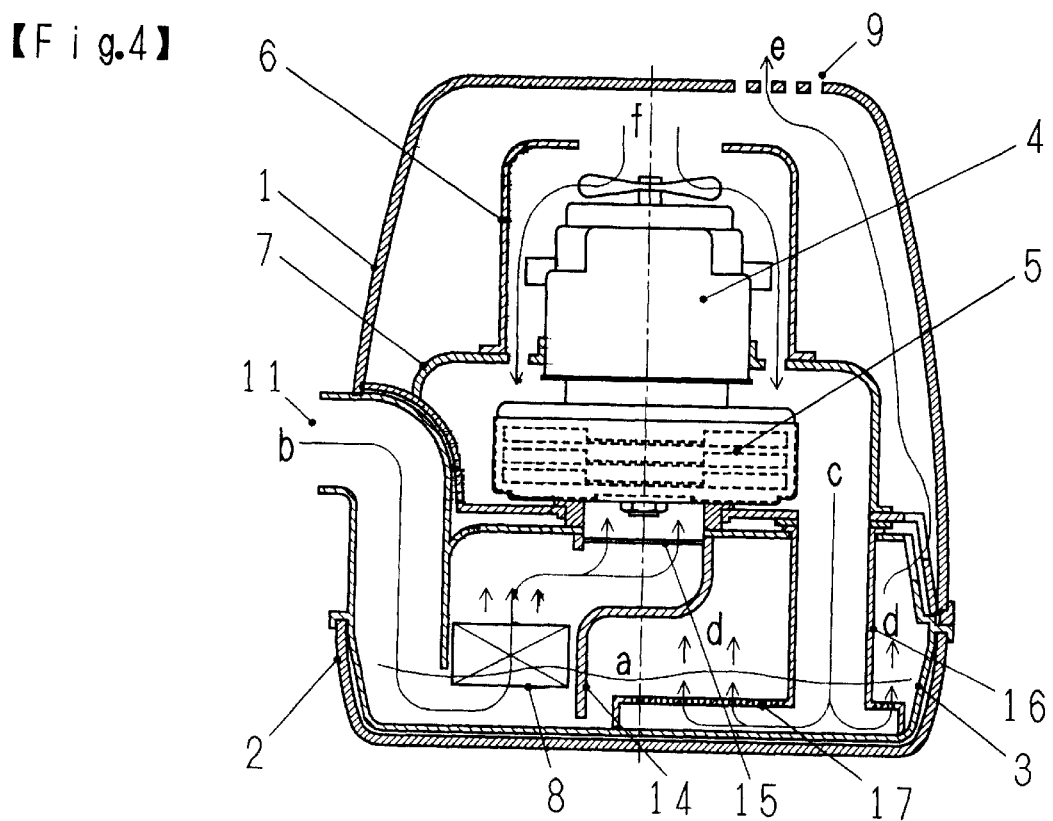

VACUUM CLEANER

BACKGROUND OF THE INVENTION

1. Field of the Invention

The present invention relates to a water filter type vacuum cleaner, wherein a casing of a cleaner is provided with a motor driven blower and a detachable water tank. More particularly, the invention relates to a water filter type vacuum cleaner, wherein water previously placed in the water tank and air containing sucked dust particles are caused to be stirred after being drawn into the motor driven blower, at which dust particles are captured by the water.

2. Description of the Related Art

In the water filter type vacuum cleaner, a conventional structure is provided in which the air containing the sucked dust particles is caused to strike against the water previously placed in the water tank to capture the dust particles by the water, and then a separator separates the air from the water and exhausts the air.

SUMMARY OF THE INVENTION

When the air containing the sucked dust particles is caused to strike against the water placed previously in the water tank, and the dust particles are caused to be captured by the water, water splashes onto the separator, and the separator frequently fails to separate the water from the air, which results in the water being in the exhaust air such that a sucking force cannot be produced. Furthermore, all the dust particles contained in the sucked air are not necessarily captured upon contact with the water, and the dust particles that pass without contacting the water and then exhausted are not small in quantity. For this reason, when compared with a dry type paper or cloth filter type vacuum cleaner, the quantity of the dust particles existing in the exhaust is large. Moreover, the air sucked by the vacuum cleaner causes a turbulent flow by the centrifugal force around the blades of the separator that weakens the sucking force.

The present invention solves the foregoing numerous drawbacks of the conventional art. As a means of solving the drawbacks, the present invention proposes that the air that contains the dust particles sucked from a suction opening 11 is caused to be sucked into the vacuum cleaner having water of a proper quantity placed in a water tank 3 and adjusted by a water level guide 12. The water and the air are naturally separated (as shown by d) at the water level a by returning the air and water to the water tank 3, thereby eliminating the need for a mechanism such as a separator 10 or a spider 13 for separating the water and the air.

The present invention has an effect of improving an efficiency of removal of dust particles in the air by a construction wherein the air containing the dust particles sucked from the suction opening 11 by an electric blower 5 provided in the vacuum cleaner of the present invention is caused to strike against the water placed previously in the water tank 3. The air and the water are sucked into the electric blower 5 through a communicating duct 14 connected to the electric blower 5, and the air and water are stirred by a high speed rotation of the electric blower 5. The dust particles contained in the sucked air are completely captured by the water and are returned to the water in the water tank 3 through an exhaust duct 16 to generate bubbles such that the water and the air are naturally separated from each other to exhaust the air.

In the case of the conventional system, the sucking force could not be elevated due to the provision of a mechanism such as the separator 10 or the spider 13 for separating the water and the air, but in this invention, there is no need for separating the water and the air so that the sucking force (an efficiency of sucking work) can be elevated to a maximum degree on account of freely controlling the capacity of the electric blower 5.

In the case of mixing medicines (a liquid such as medicines or solvents, for example, disinfectant, deodorant and the like) in the water of the water tank 3, various kinds of efficaciouses of the medicines and the like such as a sterilizing agent with addition of, for example, a disinfectant can be used.

In the case of sucking a detergent in cleaning a carpet, it is suggested to mix a surface active agent beforehand with the water in the water tank.

BRIEF DESCRIPTION OF THE DRAWINGS

FIG. 1 is a cross sectional view of a conventional water filter type vacuum cleaner.

FIG. 2 is a cross sectional view of a water filter type vacuum cleaner according to a first embodiment of the present invention, and FIGS. 3 and 4 are cross sectional views of a water filter type vacuum cleaner according to a second embodiment of the present invention.

DETAILED DESCRIPTION OF THE PREFERRED EMBODIMENTS

An embodiment of the present invention will be described in detail with reference to the drawings.

[Embodiment-1 According to the Present Invention]

The air that contains dust particles sucked from a suction opening 11 by an electric blower 5 provided in the vacuum cleaner strikes against the water placed previously in a water tank 3 to remove larger particles of dust, and the air is then sucked into the electric blower 5 through a wire netting 15. Inappropriately large dust particles are captured by the water, and then the air together with the water pass through a suction duct 14 into the electric blower 5 (route b). At this time, a quantity of the water to be mixed with the air that contains the dust particles is adjusted at the position of a suction opening 18.

Stirring is carried out at a high speed rotation of the electric blower 5 and the dust particles contained in the sucked air are forcedly captured by the water. The sucked air is conveyed (route c) into the water of the water tank 3 after passing through an exhaust duct 16. Minute bubbles are generated by a bubble generating filter 17 in the water tank 3 to perform a natural separation (as shown in route d) of the water and the air to be exhausted (route e).

It thus becomes possible to yield a clean exhaust almost free of dust particles resulting by the strong sucking force when this method is employed. Furthermore, in the case where a drive motor 4 of the electric blower 5 provided in the vacuum cleaner is of a brush type, carbon powder that is generated due to wear and tear of the brush of the electric motor 4 may be captured by the water of the water tank 3 by arranging a joint flow of the air coming out of the motor driven blower 5 with the air (route f) for cooling that exists in motor cover 6.

[Embodiment-2 According to the Present Invention]

In this embodiment, when a structure that allows a vertical split of the water tank 3 into upper and lower parts is employed, an internal cleaning of the water tank 3 becomes easy. Furthermore, an extensive internal cleaning is feasible by arranging the communicating duct 14 or a wire netting 15, exhaust duct 16, bubble generating filter 17, and the like to be removable.

DESCRIPTION OF REFERENCE NUMERALS

1 Casing
2 Casing bottom portion
3 Water tank
4 Drive motor
5 Motor driven blower
6 Motor cover
7 Exhaust cover
8 Casing partition plate
9 Exhaust opening
10 Separator
11 Sucking opening
12 Water level guide
13 Spider
14 Communicating duct
15 Wire netting
16 Exhaust duct
17 Bubble generating filter
18 Water absorption opening

What is claimed is:

1. A vacuum cleaner comprising:
a casing having an opening through which air and dust particles are to enter said casing;
a motor driven blower within said casing;
a tank within said casing, wherein said tank is to contain a liquid;
a first passageway in said housing extending from said opening to said motor driven blower through said tank; and
a second passageway in said housing extending from said motor driven blower to said tank,
such that when liquid is contained in said tank, upon rotation of said motor driven blower air and dust particles are drawn into said casing through said opening and pass through said first passageway into contact with the liquid contained in said tank, then air, dust particles and liquid are conveyed from said tank to said motor driven blower at which the air, dust particles and liquid are stirred by said motor driven blower whereby the dust particles become captured by the liquid, then the air, liquid and captured dust particles are conveyed from said motor driven blower through said second passageway into contact with the liquid contained in said tank whereat the air and liquid are separated from each other, and then the air is exhausted from said casing.

2. The vacuum cleaner according to claim 1, wherein said tank comprises a water tank and the liquid to be contained by said tank is water.

3. The vacuum cleaner according to claim 2, wherein said water tank is removable from said casing.

4. The vacuum cleaner according to claim 3, further comprising a bubble generating device to generate bubbles upon conveyance of the air, captured dust particles and water from said motor driven blower through said second passageway and into contact with the water contained in said water tank, to aid in the separation of the air and water from each other prior to the air being exhausted from said casing.

5. The vacuum cleaner according to claim 4, wherein said bubble generating device is positioned within said water tank such that after the air, captured dust particles and water are conveyed from said motor driven blower through said second passageway and into contact with the water contained in said water tank, the air is further conveyed to said bubble generating device and is then exhausted from said casing.

6. The vacuum cleaner according to claim 5, further comprising a screen positioned within said first passageway to prevent dust particles greater than a predetermined size from being conveyed from said opening to said motor driven blower.

7. The vacuum cleaner according to claim 6, wherein said screen is positioned within said first passageway such that upon conveyance of the air, dust particles and water from the water contained in said water tank to said motor driven blower, the dust particles greater than the predetermined size are prevented from being conveyed to said motor driven blower by contacting said screen.

8. The vacuum cleaner according to claim 2, further comprising a bubble generating device to generate bubbles upon conveyance of the air, captured dust particles and water from said motor driven blower through said second passageway and into contact with the water contained in said water tank, to aid in the separation of the air and water from each other prior to the air being exhausted from said casing.

9. The vacuum cleaner according to claim 8, wherein said bubble generating device is positioned within said water tank such that after the air, captured dust particles and water are conveyed from said motor driven blower through said second passageway and into contact with the water contained in said water tank, the air is further conveyed to said bubble generating device and is then exhausted from said casing.

10. The vacuum cleaner according to claim 2, further comprising a screen positioned within said first passageway to prevent dust particles greater than a predetermined size from being conveyed from said opening to said motor driven blower.

11. The vacuum cleaner according to claim 10, wherein said screen is positioned within said first passageway such that upon conveyance of the air, dust particles and water from the water contained in said water tank to said motor driven blower, the dust particles greater than the predetermined size are prevented from being conveyed to said motor driven blower by contacting said screen.

12. The vacuum cleaner according to claim 1, wherein said tank is removable from said casing.

13. The vacuum cleaner according to claim 12, further comprising a bubble generating device to generate bubbles upon conveyance of the air, captured dust particles and liquid from said motor driven blower through said second passageway and into contact with the liquid contained in said tank, to aid in the separation of the air and liquid from each other prior to the air being exhausted from said casing.

14. The vacuum cleaner according to claim 13, wherein said bubble generating device is positioned within said tank such that after the air, captured dust particles and liquid are conveyed from said motor driven blower through said second passageway and into contact with the liquid contained in said tank, the air is further conveyed to said bubble generating device and is then exhausted from said casing.

15. The vacuum cleaner according to claim 12, further comprising a screen positioned within said first passageway to prevent dust particles greater than a predetermined size from being conveyed from said opening to said motor driven blower.

16. The vacuum cleaner according to claim 15, wherein said screen is positioned within said first passageway such that upon conveyance of the air, dust particles and liquid from the liquid contained in said tank to said motor driven blower, the dust particles greater than the predetermined size are prevented from being conveyed to said motor driven blower by contacting said screen.

17. The vacuum cleaner according to claim 1, further comprising a bubble generating device to generate bubbles upon conveyance of the air, captured dust particles and liquid from said motor driven blower through said second passageway and into contact with the liquid contained in said tank, to aid in the separation of the air and liquid from each other prior to the air being exhausted from said casing.

18. The vacuum cleaner according to claim 17, wherein said bubble generating device is positioned within said tank such that after the air, captured dust particles and liquid are conveyed from said motor driven blower through said second passageway and into contact with the liquid contained in said tank, the air is further conveyed to said bubble generating device and is then exhausted from said casing.

19. The vacuum cleaner according to claim 1, further comprising a screen positioned within said first passageway to prevent dust particles greater than a predetermined size from being conveyed from said opening to said motor driven blower.

20. The vacuum cleaner according to claim 19, wherein said screen is positioned within said first passageway such that upon conveyance of the air, dust particles and liquid from the liquid contained in said tank to said motor driven blower, the dust particles greater than the predetermined size are prevented from being conveyed to said motor driven blower by contacting said screen.

\* \* \* \* \*